United States Patent [19]

Chaplin et al.

[11] Patent Number: 4,527,282

[45] Date of Patent: Jul. 2, 1985

[54] METHOD AND APPARATUS FOR LOW FREQUENCY ACTIVE ATTENUATION

[75] Inventors: George B. B. Chaplin; Andrew Jones, both of Colchester; Owen Jones, Doncaster, all of United Kingdom

[73] Assignee: Sound Attenuators Limited, Essex, United Kingdom

[21] Appl. No.: 491,324

[22] PCT Filed: Aug. 10, 1982

[86] PCT No.: PCT/GB82/00250

§ 371 Date: Apr. 11, 1983

§ 102(e) Date: Apr. 11, 1983

[87] PCT Pub. No.: WO83/00580

PCT Pub. Date: Feb. 17, 1983

[30] Foreign Application Priority Data

Aug. 11, 1981 [GB] United Kingdom ............... 8124567

[51] Int. Cl.³ ............... G10K 11/16; F16L 55/02
[52] U.S. Cl. ............... 381/71; 381/94
[58] Field of Search ............... 381/71, 56, 73, 94

[56] References Cited

FOREIGN PATENT DOCUMENTS 0040462 11/1981 European Pat. Off. .
2329929 5/1977 France .
WO81/01480 5/1981 PCT Int'l Appl. .
1492963 11/1977 United Kingdom .

Primary Examiner—Gene Z. Rubinson
Assistant Examiner—James L. Dwyer
Attorney, Agent, or Firm—Dann, Dorfman, Herrell & Skillman

[57] ABSTRACT

A low frequency attenuation method based on the virtual earth system has the driver feeding cancelling waveforms into a partially closed volume which contains the microphone of the virtual earth feed-back loop. The volume preferably has a maximum dimensions which lies between one third and one seventh of the wavelength of the highest frequency to be nulled. An outlet port of the volume can be tuned to the center frequency of the band of frequencies to be nulled.

10 Claims, 8 Drawing Figures

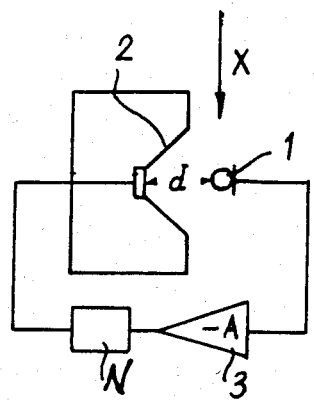
PRIOR ART  *FIG. 1*
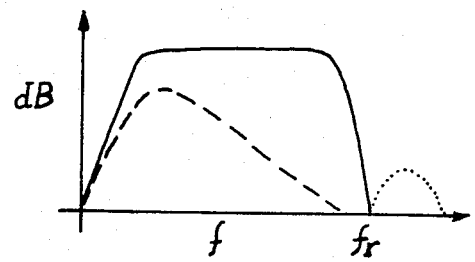
*FIG. 2*
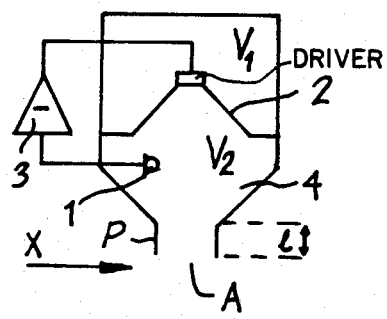
FIG. 3
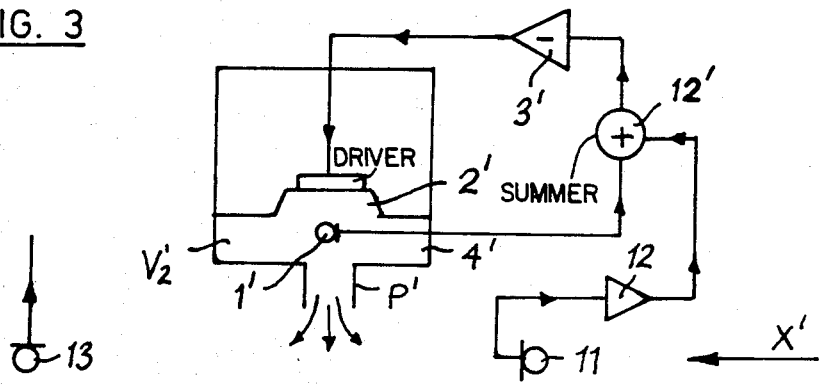
FIG. 4

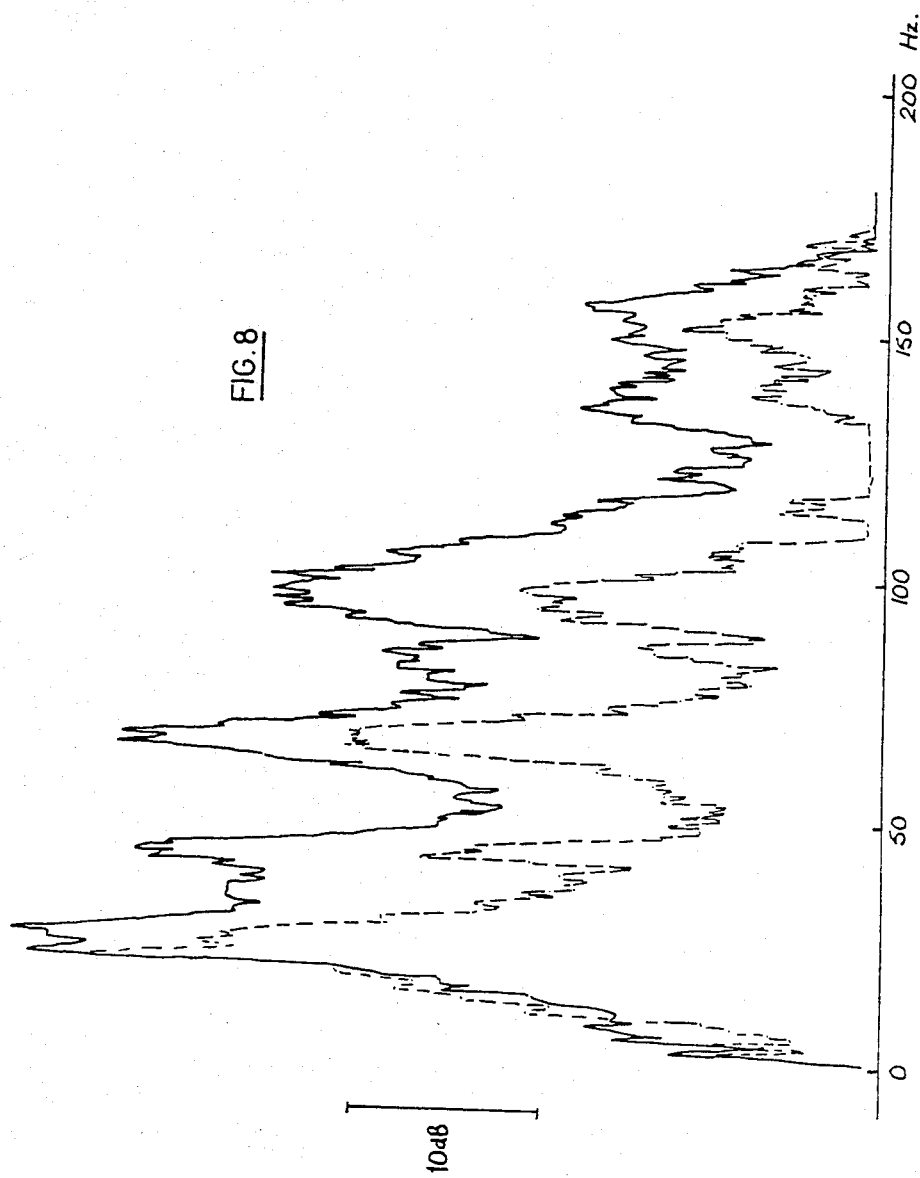

4,527,282

METHOD AND APPARATUS FOR LOW FREQUENCY ACTIVE ATTENUATION

TECHNICAL FIELD

This invention relates to an improved method of, and improved apparatus for, the active attenuation of low frequency gas-borne vibrations (e.g. noise). The method finds particularly useful applications in the attenuation of very low frequency noise in exhaust gases from engines.

DISCUSSION OF PRIOR ART

The invention can be considered as an extension of the simple virtual earth active attenuation system which is diagrammatically illustrated in FIG. 1 of the accompanying drawings. In FIG. 1, a pressure-sensing microphone 1 is located a distance d from a loudspeaker (or driver) 2 in a position where the microphone can receive primary vibrations, travelling in the direction of the arrow X, from a source, such as an engine exhaust, (not shown), and secondary vibrations from the loudspeaker 2. The loudspeaker 2 is of the closed-back type and is disposed adjacent to the path of the primary vibrations. The microphone 1 is coupled to the loudspeaker 2 via an electronic circuit which includes a phase-inverting amplifier 3.

LIMITATIONS OF PRIOR ART

The arrangement shown in FIG. 1 is theoretically capable of producing a constant or null pressure in the composite vibration field generated by the source and the driver 2 in the immediate vicinity of the microphone 1. The simple virtual earth system shown in FIG. 1 will, however, oscillate at a critical frequency fr which is, inter alia, a function of the distance d. The smaller is the distance d, the higher will be the frequency fr, and the greater is the band width over which the system can be used to obtain useful active attenuation. Unfortunately, however, with a conventional driver operating into free space, the field pattern of the secondary vibrations emitted thereby becomes increasingly more non-uniform the closer one comes to the driver 2. Thus there is a practical limit as to how close one can locate the microphone 1 to the driver 2, and yet obtain useful attenuation remote from the microphone 1. Thus the non-uniformity of the near-field of the driver 2 sets an upper limit to the frequencies which can be cancelled with a simple virtual earth system shown in FIG. 1.

In order to minimise the delay round the loop 1, 3, 2 and hence reduce the instability, the microphone 1 must be placed as close as possible to the loudspeaker 2. The microphone 1 is thus located in the near field of the driver, where the sound pressure changes much more rapidly with distance, compared to some position more remote from the driver. It follows, therefore, that the pressure waveform produced precisely at the microphone 1 by the driver 2 matches the primary vibration field only over a very localised region of space, thus severely limiting the region of resultant null pressure.

Furthermore, the pressure waveform received by the microphone 1 is also affected by nearby objects creating reflections.

To prevent a system such as that shown in FIG. 1 oscillating at the frequency fr, it is known to arrange for the gain of the amplifier 3 to be decreased to unity before the critical frequency fr is reached. This frequency dependent characteristic of the gain is known as the "roll-off" and although a rapid (or high order) roll-off might appear to be desirable to maximise the useful band width of the system, in practice generating a rapid roll-off, by means of a gain-control network in the electronic circuit (such as the network N shown in FIG. 1) reduces the stability of the system at lower frequencies. Thus the "roll-off" generally adopted with a system shown in FIG. 1 is of the form shown by the dashed line in FIG. 2.

Thus from the standpoint of the poor near-field uniformity of known drivers working into free space and the natural limitations set by high order electronically-induced roll-offs, the simple virtual earth system shown in FIG. 1 finds little practical use.

BRIEF DISCLOSURE OF INVENTION

We have now found that the useful working range of a virtual earth system can be greatly enhanced by the simple expedient of feeding the vibrational output of the driver, into an acoustically partially closed volume whose largest dimension is smaller than the wavelength of the highest frequency of the primary vibration to be nulled and locating the microphone in the said volume.

We have found that if the driver is feeding the secondary vibrations into a partially closed small volume, whose largest dimension is at least several (e.g. from 3 to 7, typically 4 or 5) times smaller than the wavelength of the highest frequency of the primary vibration to be nulled, the near field of the driver becomes much more uniform and the acoustic effect of the partially closed volume gives a natural roll-off characteristic which is at least equivalent to a second order electronically-produced frequency-gain characteristic.

By enclosing the microphone and the driver in a relatively small volume, a zone of substantially uniform pressure is created around the microphone, the microphone is automatically isolated from nearby external reflecting surfaces, and the efficiency of the virtual earth system to null primary vibrations can be increased at both the lower and upper ends of the usable frequency band.

The primary vibrations to be cancelled can be fed through a port directly into the partially closed small volume and/or they can be fed in via a diaphragm or other passive radiator forming a part of the wall defining the small volume. As an alternative, the primary vibrations can be sensed by a microphone upstream of the small volume, the output of the microphone being fed to the loop of the virtual earth system via a variable gain amplifier.

BRIEF DESCRIPTION OF DRAWINGS

The invention will now be described, by way of example, with reference to the accompanying drawings, in which:

FIG. 1 is the prior art system already discussed,

FIG. 2 is a plot of gain (in dB's) against frequency for, inter alia, the system of FIG. 1, FIG. 3 is a schematic illustration of a simple system according to the invention, FIGS. 4 and 5 are modified systems according to the invention operating respectively, into open space and into a duct, FIG. 8 is the frequency spectrum of an internal combustion engine with and without the employment of a system according to the invention.

DESCRIPTION OF SPECIFIC EMBODIMENTS

Figure 5:
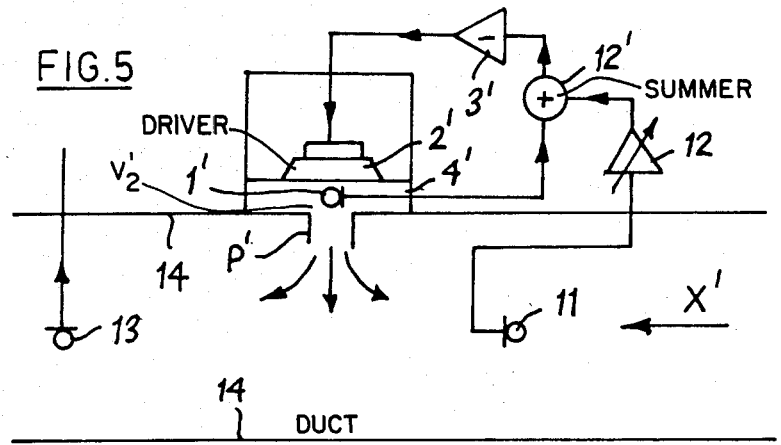

FIG. 3 shows a virtual earth system modified in accordance with the invention. The microphone 1 is located in a partially closed volume 4 (volume $V_2$) which opens, via a port P to a noise field X.

The port P can be tuned (e.g. by adjusting its cross-sectional area A or the length l) to improve the low frequency efficiency of the loop 1, 3, 2 and the gain/frequency characteristics of the system shown in FIG. 3 is as shown in the full line in FIG. 2.

The low frequency rise in cancellation efficiency in both the full line and dashed line graphs in FIG. 2 are similar, since they are both dictated by the characteristics of the driver 2. The decline in cancellation efficiency in the dashed line curve is due to the roll-off induced by the electronic network N in FIG. 1. The extended cancellation efficiency and steeper roll-off of the full line curve result from the effect of the resonator volume 4. The small peak at the higher frequencies (shown dotted in FIG. 2) which can appear with a system as shown in FIG. 3 can easily be removed by an electronic network if the need to do so arises. The performance actually obtained with a system such as that shown in FIG. 3 can be varied by adjusting the ratio between the volumes $V_1$ and $V_2$ and the cross-section A and length l of the outlet port P of the volume 4 as shown in FIG. 3.

Since the near field of the driver is made more uniform by the presence of the partially closed volume 4, the microphone 1 can be positioned very close to the driver 2, the actual position being optimised in each case. Desirably the microphone 1 is a pressure microphone. Passive sound damping material (not shown) can be included in the small volume $V_2$ to improve the attenuating performance.

Because the microphone 1 shown in FIG. 3 is substantially isolated from the pressure waveform X outside the small volume 4, the system shown in FIG. 3 is not able to appreciably "null" the sound pressure outside the port P, and so a second microphone 11 (normally a directional microphone) can be used to perform this function as shown in FIG. 4.

The first microphone 1', in conjunction with the negative feedback loop 1', 3', 2' of the system of FIG. 4, converts the loudspeaker assembly into a system in which the output pressure from the port P' is substantially proportional to the voltage applied to the loop amplifier 3', and independent of frequency over the band of interest. It thus acts as a filter which automatically compensates for unwanted characteristics of the loudspeaker assembly.

The second microphone 11 picks up the external noise signal X' and feeds it into the loop 1', 3', 2' via an amplifier 12 and a summer 12' in such a way as to produce an inverse pressure waveform at the port P'. By manually, or automatically, adjusting the gain of the amplifier 12, the external sound pressure waveform X can be cancelled downstream of the port P'.

It should be noted that the microphone 11, unlike the microphone 1 in FIG. 1, is not intended to act as a null point in a negative feedback loop, but as a means of detecting the incident signal X'. It is thus normally required to be at least semi-isolated, acoustically, from the loudspeaker part. FIG. 4 shows this being accomplished by the use of a directional microphone, such as a cardioid, or a directional array of microphones. The microphone 11 would normally be positioned such that the external and cancelling waves both reach the outlet of the port P' (the required "null" position) at the same time.

The degree of cancellation achieved with the system of FIG. 4 can, for example, be measured by a "down stream" microphone 13, and its output used to adjust the amplitude gain of the amplifier 12.

An example of the use of a system according to the invention in a duct 14 is shown in FIG. 5, the same reference numerals being used in FIG. 5 as in FIG. 4. As a further example, the system could be used with the port P' of the loudspeaker volume 4' situated in the vicinity of the end of the duct.

A further development of the invention, allows the microphones 11 and 13 in FIGS. 4 and 5 to be dispensed with altogether.

Figure 6:
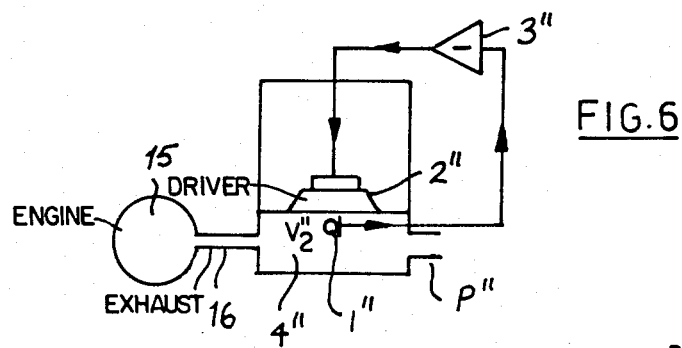
FIGS. 6 and 7 are systems according to the invention for silencing the exhaust noise of an engine.

FIG. 6 shows how the system of FIG. 4 can be modified to cancel the exhaust noise of an engine 15 issuing from an exhaust pipe 16. Double primes are used to designate integers which are similar to those used in FIGS. 4 and 5.

The exhaust pipe 16 is introduced into the small volume 4", and the port P" is moved so as to be in line with the exhaust gas stream (for convenience).

In this particular embodiment, the "uniform pressure" characteristics of the small volume 4" enable almost perfect mixing and nulling of the noise from the exhaust pipe 16 and the cancelling noise from the loudspeaker 2".

Additionally, a vibration-attenuating gas-permeable material such as glass fibre, or mineral wool, can be included in the small volume 4", in such a way as to reduce heat transfer from the exhaust gases to the microphone 1" and the loudspeaker 2" and also to attenuate unwanted high frequencies within the small volume 4".

Figure 7:
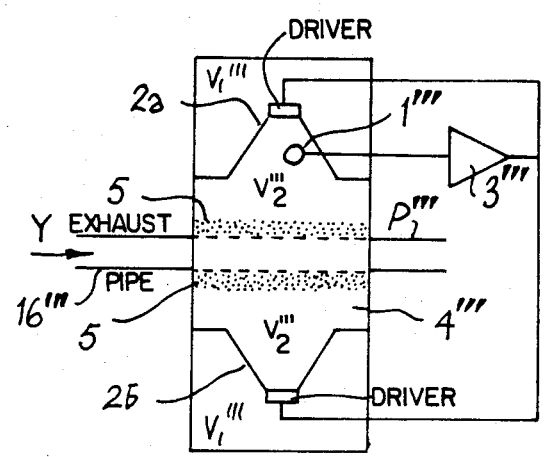

FIG. 7 illustrates a double system which can be used to increase the power available for cancellation. The drivers in FIG. 7 are shown as 2a and 2b, each feeding output power into a partially closed small volume 4'''. The primary vibration (e.g. from the exhaust pipe 16''' of an IC engine) is fed into the volume 4''' in the direction of the arrow Y and an amplifier 3''' links a pressure microphone 1''' to the two in-phase drivers 2a and 2b. In view of the temperature of the gas flowing through the volume 4''', layers 5 of gas permeable thermal insulation (e.g. glass fibres around a perforated tube) protect the drivers and microphone from the heat and also act to attenuate the frequencies higher than the frequency fr of the system.

It is not necessary, or indeed desirable, for the exhaust pipe 16''' to be a good fit in the small volume 4'''. An annular gap can be left around the pipe 16''' to occasion the entrainment of atmospheric air into the volume 4''' which can be used to lower the gas temperature in the layers 5. Holes (not shown) can be provided in the walls delimiting the volume 4''' and careful design of such holes could entrain just enough air to purge the loudspeakers 2a and 2b of exhaust gases, and reduce the effect of heat radiated from the layers 5. Other methods of purging the small volume 4''' could be used such as the introduction of air into the region near the loudspeakers, at sufficient pressure to ensure a flow of air into the exhaust gases and out through the port P'''. Such pressurised air, if derived from a "noisy" compressor, would also be silenced in its passage through the small volume 4'''.

FIG. 8 gives an indication of the performance of the system shown in FIG. 7, the full line curve indicating the noise level from an IC engine when the amplifier 3''' is not operating and the dashed line representing the improvement obtained when the amplifier is operational. It will be seen that attenuations of the order of 15 dB are obtainable over a substantial part of the frequency range 20 to 160 Hertz.

The volume 4''' was around 45×45×30 cm, the rear volume $V_1'''$ of each loudspeaker 2a, 2b was around 45×45×45 cm, the pipe 16''' was around 5 cm diameter and the port P''' some 13 cm diameter and 10 cm long. The speakers 2a, 2b were each some 38 cm diameter and rated at 200 watts and the layers 5 were of fibre glass some 4 cm thick. Each component of the system (volume 4''', port P''' and rear volumes $V_1'''$) was tuned to 85 Hertz.

We claim:

1. A method of attenuating low frequency gas-borne primary vibrations using the virtual earth system comprising locating a pressure microphone (1) in the near field of a driver (2), enclosing the microphone (1) in an acoustically partially closed volume (4) whose largest dimension is smaller than the wavelength of the highest frequency of the primary vibration to be nulled, and introducing the primary vibrations into the said partially closed volume and linking the pressure microphone to the driver (2) by an amplifier (3) in a feed-back loop whereby the driver produces an output in the form of gas-borne secondary vibrations which attenuate the primary vibrations in the vicinity of the microphone and produce a null pressure at the microphone (1).

2. A method as claimed in claim 1, characterised in that the partially closed volume (4) has a largest dimension which is between the third and one seventh of the wavelength of the highest frequency of the primary vibration to be nulled.

3. A method as claimed in claim 1, characterised in that the primary vibrations are sensed with a directional microphone (11) fed via a variable amplifier (12) to the loop (3', 2', 1').

4. A method as claimed in claim 3, characterised in that the gain of the variable amplifier (12) is set on the basis of the residual vibration sensed by a further microphone (13) external to the partially closed volume (4').

5. A method as claimed in claim 1, characterised in that the primary vibrations are fed directly through the partially closed volume (4'') to exit from a port (P'') thereof with reduced vibrational amplitude.

6. A method as claimed in claim 5, characterised in that the partially closed volume (4'') contains gas permeable vibration-attenuating material (5) interposed between the gas stream carrying the primary vibrations and the driver (2a, 2b).

7. A method as claimed in claim 6, characterised in that the partially closed volume (4''') contains at least one additional driver (2a, 2b) of the same phase in the feed-back loop (1''', 3''', 2a, 2b).

8. Apparatus for attenuating low frequency gas-borne primary vibrations comprising a pressure microphone (1), a driver (2) and an amplifier (3) linked in a feedback loop and a duct to feed a gas carrying the primary vibrations to the vicinity of the microphone (1), characterised in that the microphone (1) is located in an acoustically partially closed volume (4) whose largest dimension is at least several times smaller than the wavelength of the highest frequency of the primary vibration to be nulled, the duct (16, 16''') and the driver (2', 2a, 2b) being dispoed to feed their vibrations directly into the said volume.

9. Apparatus as claimed in claim 8, characterised in that the partially closed volume (4''') communicates with the atmosphere via a port (P''') tuned to a frequency at or close to the centre frequency of the band of frequencies of the primary vibration to be nulled.

10. Apparatus as claimed in claim 8, characterised in that there is at least one additional driver (2a, 2b) of the same phase that feeds power into the partially closed volume (4''').

* * * * *

UNITED STATES PATENT AND TRADEMARK OFFICE
CERTIFICATE OF CORRECTION

PATENT NO. : 4,527,282

DATED : July 2, 1985

INVENTOR(S) : George B. B. Chaplin, Andrew Jones & Owen Jones

It is certified that error appears in the above-identified patent and that said Letters Patent is hereby corrected as shown below:

```
    Claim 2, line 3, delete "the" (first occurrence) and
insert --one--.
    Claim 8, line 10, delete "2'" and insert --2"--.
```

Signed and Sealed this

Nineteenth Day of November 1985

[SEAL]

Attest:

DONALD J. QUIGG

Attesting Officer

Commissioner of Patents and Trademarks